(12) United States Patent
Deng

(10) Patent No.: US 12,529,235 B2
(45) Date of Patent: Jan. 20, 2026

(54) SWIMMING POOL ROBOT WITH DOUBLE DRAIN PIPES AND ITS CONTROL METHOD

(71) Applicant: Shenzhen Seauto Technology Co., Ltd., Guangdong (CN)

(72) Inventor: Zhuoming Deng, Shenzhen (CN)

(73) Assignee: Shenzhen Seauto Technology Co., Ltd., Guangdong (CN)

( * ) Notice: Subject to any disclaimer, the term of this patent is extended or adjusted under 35 U.S.C. 154(b) by 458 days.

(21) Appl. No.: 18/012,010

(22) PCT Filed: Oct. 24, 2022

(86) PCT No.: PCT/CN2022/126877
§ 371 (c)(1),
(2) Date: Dec. 21, 2022

(87) PCT Pub. No.: WO2024/073906
PCT Pub. Date: Apr. 11, 2024

(65) Prior Publication Data
US 2024/0247512 A1 Jul. 25, 2024

(30) Foreign Application Priority Data
Oct. 8, 2022 (CN) .......................... 202211223304.5

(51) Int. Cl.
*E04H 4/16* (2006.01)
(52) U.S. Cl.
CPC ......... *E04H 4/1654* (2013.01); *E04H 4/1636* (2013.01); *E04H 4/1663* (2013.01)

(58) Field of Classification Search
CPC ............................... E04H 4/16; E04H 4/1636
See application file for complete search history.

(56) References Cited

U.S. PATENT DOCUMENTS

2013/0341284 A1* 12/2013 Michelon ............. E04H 4/1654
210/85
2017/0212523 A1* 7/2017 Witelson ................ G05D 1/005
(Continued)

*Primary Examiner* — Michael D Jennings
(74) *Attorney, Agent, or Firm* — ScienBiziP, P.C.

(57) ABSTRACT

A swimming pool robot with double drain pipes comprising a vehicle body, an outer filter screen and an internal filter screen; the outer filter screen is detachably disposed in the vehicle body, the inner filter screen is detachably disposed in the outer filter screen, an outer wall of the inner filter screen and an inner wall of the outer filter screen, and/or an inner wall of the internal filter screen is provided with foam; a sensing device for sensing the inner filter screen is provided in the vehicle body, and a climbing driving mechanism for driving the swimming pool robot to climb a slope is symmetrically provided at two sides of the top of the vehicle body; the vehicle body is further provided with a controller respectively connected to the sensing device and the climbing drive mechanism, and the controller is used for controlling the swimming pool robot to turn around or turn when the sensing device senses the inner filter screen and a swimming pool wall is provided in front of the swimming pool robot. Compared with the prior art, the disclosure not only enriches the functionality of the swimming pool robot, improves the applicability range of a swimming pool for collecting dirt, improves the efficiency of cleaning a swimming pool, and precisely controls the movement direction of a swimming pool robot.

6 Claims, 6 Drawing Sheets

(56) References Cited

U.S. PATENT DOCUMENTS

| | | | |
|---|---|---|---|
| 2017/0277177 A1* | 9/2017 | Witelson | G05D 1/0225 |
| 2019/0032357 A1* | 1/2019 | Pichon | B01D 46/0086 |
| 2019/0145119 A1* | 5/2019 | Kehati | B01D 35/143 |
| | | | 15/1.7 |

* cited by examiner

SWIMMING POOL ROBOT WITH DOUBLE DRAIN PIPES AND ITS CONTROL METHOD

TECHNICAL FIELD

The disclosure relates to the technical field of robots, and particularly relates to a swimming pool robot with double drain pipes and its control method.

BACKGROUND

Cleaning of a swimming pool is generally divided into two types: one is to filter water of the swimming pool by a water filtering machine, and the other is to clean dirt on the bottom and side walls of the swimming pool by a robot.

Current swimming pool robots generally provide a drain pipe at a middle position along a central line in a front-rear direction. The robot is assisted to advance, retreat or climb a/slope by reaction forces from water in the swimming pool. However, because the drain pipe is provided along the central line, when a robot body is slightly deviated from the central line by a left or a right pull force, a forward direction of the robot will be affected.

In addition, a dust bag is generally installed in a robot body to receive trash (such as leaves and sand) in a swimming pool. The structure and function of the dust gab are simple, and the scope of application is small. When a dust bag with a relatively low density is used, only trash having large volumes, such as tree leaves, can be accommodated, trash of small volumes, such as sand, may leak into the swimming pool robot through a dust bag, thereby affecting the normal operation thereof, When a dust bag with a high density is used, although dirt with a small volume can be accommodated well, due to its high density, the dust bag may also affect the water flow of the drain pipe, reduce the reaction force when it drains, and affect the swimming pool robot's forward, backward or climbing movements.

SUMMARY OF INVENTION

The main object of the present disclosure is to provide a swimming pool robot with double drain pipes and a control method therefor, which are intended to realize the functions of abundant swimming pool robots, improve the application range thereof, improve the efficiency of cleaning swimming pools, and precisely control the movement direction of the swimming pool robot.

To achieve the above objective, the present disclosure provides a swimming pool robot with double drain pipes comprising: a vehicle body; an outer filter screen; and an internal filter screen detachably disposed in the vehicle body and detachably disposed in the outer filter screen, an outer wall of the internal filter screen, an inner wall of the outer filter screen, and/or an inner wall of the internal filter screen is provided with foam;

a sensing device for sensing the internal filter screen provided in the vehicle body, and a climbing driving mechanism for driving the swimming pool robot to climb a slope symmetrically provided at two sides of the top of the vehicle body;

the vehicle body further provided with a controller respectively connected to the sensing device and the climbing drive mechanism, and the controller configured for controlling the swimming pool robot to turn around or turn when the sensing device senses the internal filter screen and senses a swimming pool wall exists in front of the swimming pool robot.

The further technical solution of the disclosure is that the climbing driving mechanism comprises a first drain outlet and a second drain outlet symmetrically disposed at two sides of the top of the vehicle body, a first driving unit and a second driving unit disposed in the vehicle body, the first driving unit and the second driving unit are configured to drive the first drain outlet and the second drain outlet to drain water respectively, so as to drive the swimming pool robot to climb a slope.

The further technical solution of the disclosure is that a water inlet is provided at the bottom of the vehicle body, and a first drain pipe and a second drain pipe that are communicated with the water inlet are symmetrically provided in the vehicle body, the first drain outlet is formed at a top opening of the first drain pipe, and the second drain outlet is formed at a top opening of the second drain pipe.

The further technical solution of the disclosure is that the first drive unit comprises a first propeller provided in the first drain pipe and a first drive motor provided in the vehicle body and connected to the first propeller, the second drive unit includes a second · Substitute Specification-Clean propeller provided in the second drain pipe and a second drive motor provided in the vehicle body and connected to the second propeller, and the first drive motor and the second drive motor are respectively connected to the controller.

The further technical solution of the disclosure is that the bottom of the vehicle body is provided with a one-way valve at the position of the water inlet for opening or closing the water inlet.

The further technical solution of the disclosure is that the bottoms of the outer filter screen and the internal filter screen are provided with a dirt suction port in communication with the water inlet.

The further technical solution of the disclosure is that a step structure is disposed at a rear end of the vehicle body, a rear end of the outer filter screen is a groove structure corresponding to the step structure, and the outer filter screen is detachably disposed on the step structure.

The further technical solution of the disclosure is that the rear end of the internal filter screen is a groove structure corresponding to the outer filter screen, a locating column is provided in the outer filter screen, and a locating hole corresponding to the locating column is provided at the bottom of the internal filter screen.

The further technical solution of the disclosure is that the sensing device comprises a sensing magnet provided on the internal filter screen and a hall switch provided in the vehicle body and corresponding to the sensing magnet, and the hall switch is connected to the controller.

In order to achieve the above purpose, the invention also provide a control method of swimming pool robot with double drain pipes, wherein the method is applied to a swimming pool robot with double drain pipes, and the method comprises the following steps:

Step S10, detecting an internal filter screen using a sensing device;

Step S20, controlling the swimming pool robot to turn around or turn when the internal filter screen is detected and there is a swimming pool wall in front of the swimming pool robot.

The beneficial effects of the swimming pool robot with double drain pipes of the present disclosure and the control method thereof are as follows: the present invention not only enriches the functionality of the robot for swimming pools, but also improves the applicability range of the robot for storing soil, improves the efficiency of cleaning swimming pools, and precisely controls the movement direction of the robot for swimming pools.

BRIEF DESCRIPTION OF DRAWINGS

To describe the technical solutions in the embodiments of the present disclosure or in the prior art more clearly, the following briefly introduces the drawings required for describing the embodiments or the prior art. Apparently, the drawings in the following description are only some embodiments of the present disclosure, other drawings may also be obtained according to structures shown in these drawings without creative efforts.

REFERENCE NUMERALS

Figure 1:
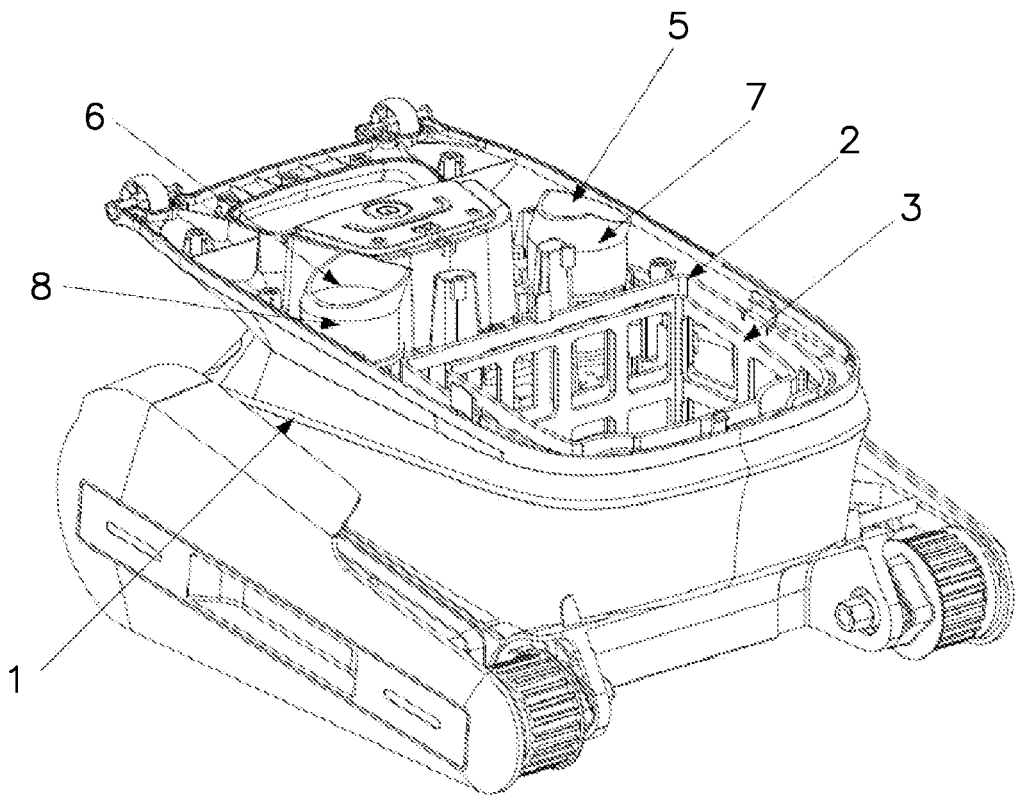
FIG. 1 is an overall structural schematic view of a swimming pool robot with double drain pipes according to a preferred embodiment of the present disclosure without an upper cover.
Figure 2:
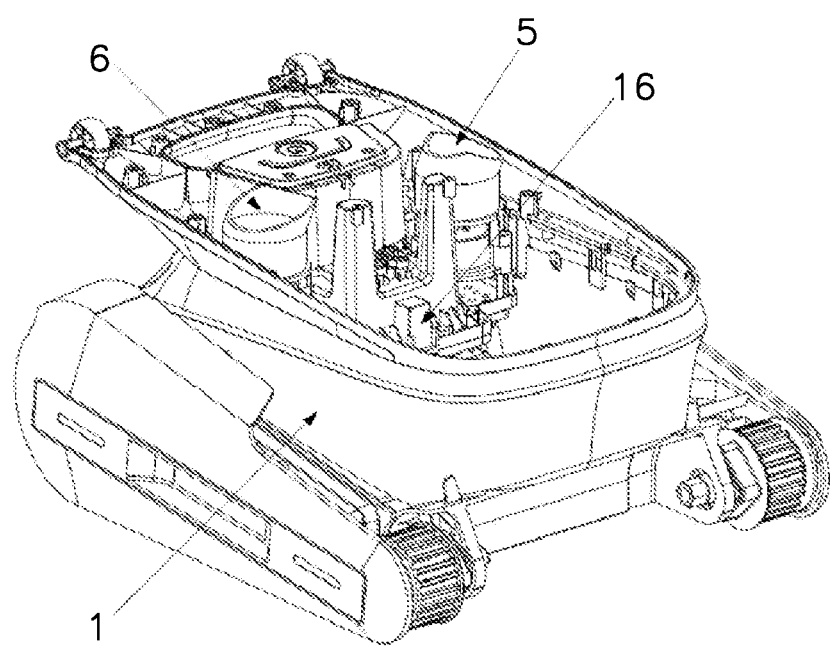
FIG. 2 is an overall structural schematic view of, a swimming pool robot with double drain pipes according to a preferred embodiment of the present disclosure without an upper cover, an internal filter screen and an outer filter screen.
Figure 3:
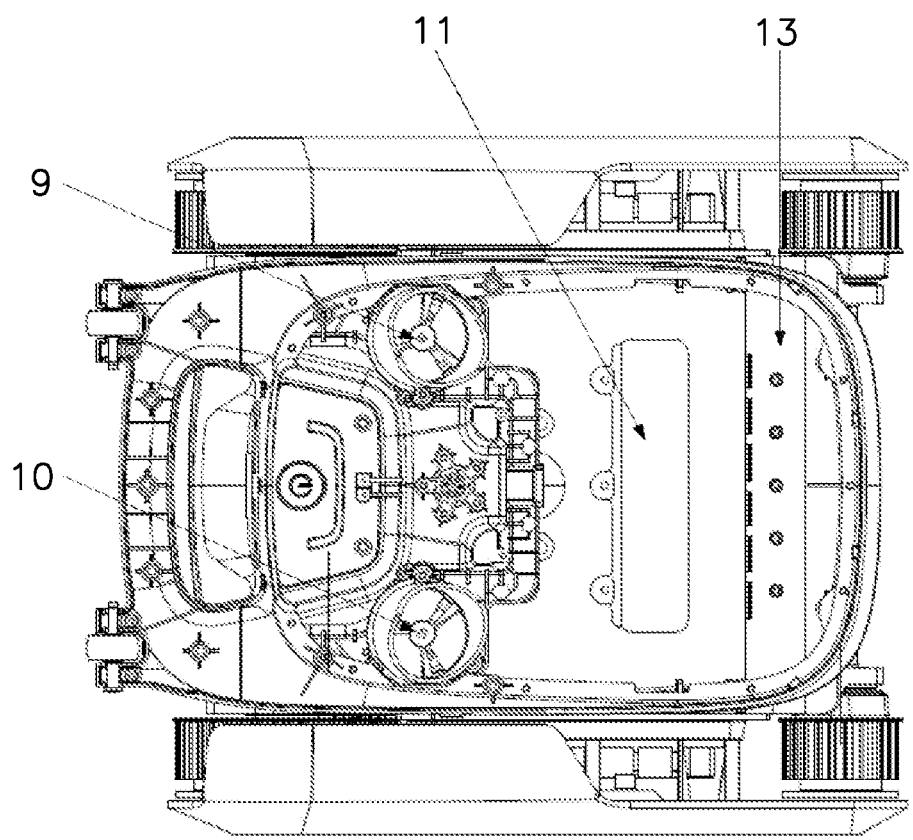
FIG. 3 is a top view of a swimming pool robot with double drain pipes according to a preferred embodiment of the present disclosure without an upper cover, an internal filter screen and an outer filter screen.
Figure 4:
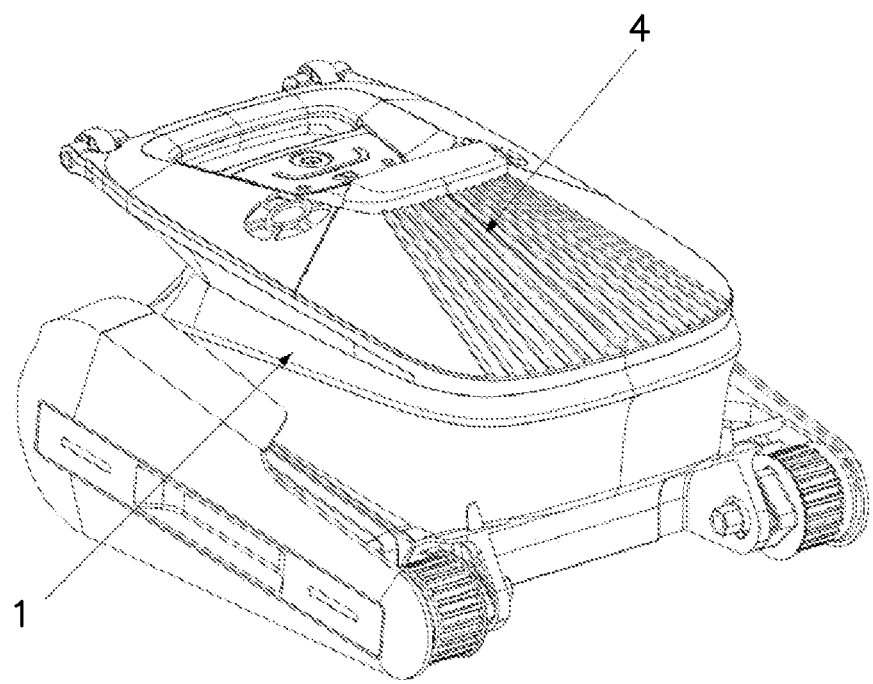
FIG. 4 is an overall structural schematic view of a swimming pool robot with double drain pipes according to a preferred embodiment of the present disclosure.
Figure 5:
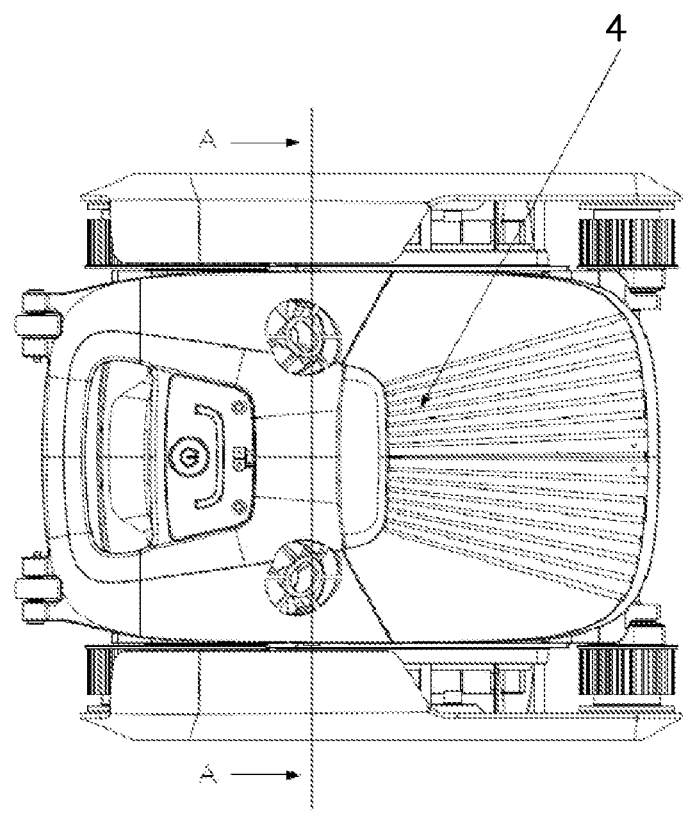
FIG. 5 is a top view of a swimming pool robot with double drain pipes according to a preferred embodiment of the present disclosure.
Figure 6:
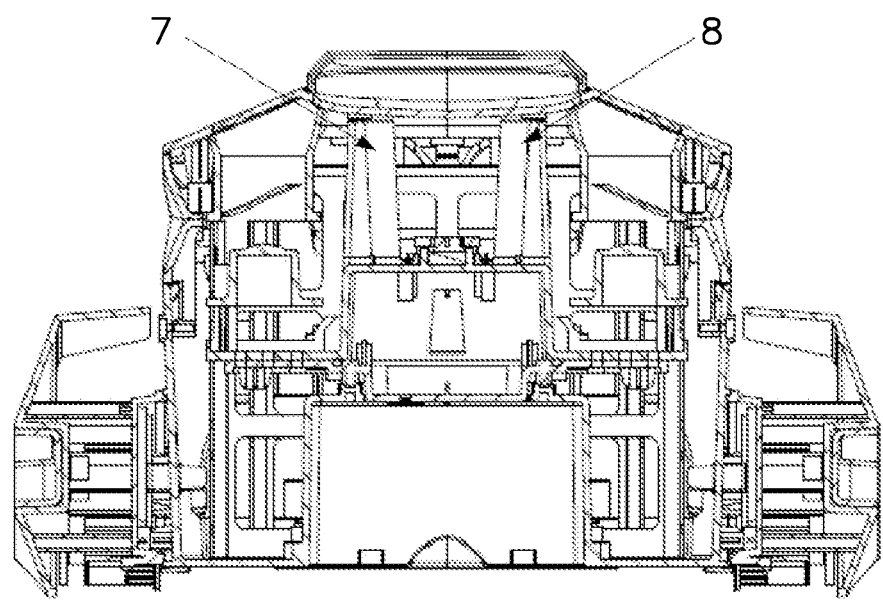
FIG. 6 is a sectional view taken along the A-A direction in FIG. 5.
Figure 7:
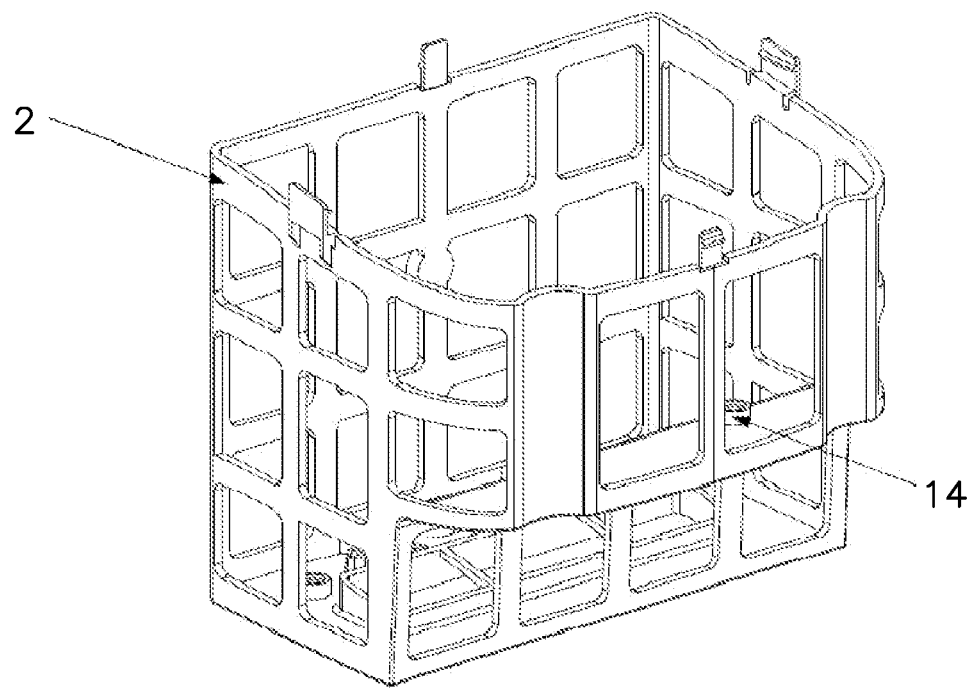
FIG. 7 is a schematic view of an overall structure of an outer filter screen.
Figure 8:
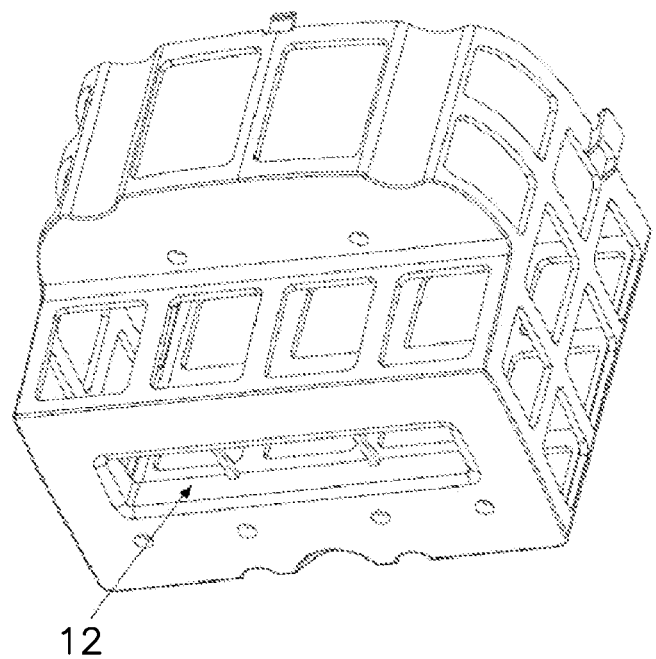
FIG. 8 is a schematic view of an overall structure of an outer filter screen at another angle.
Figure 9:
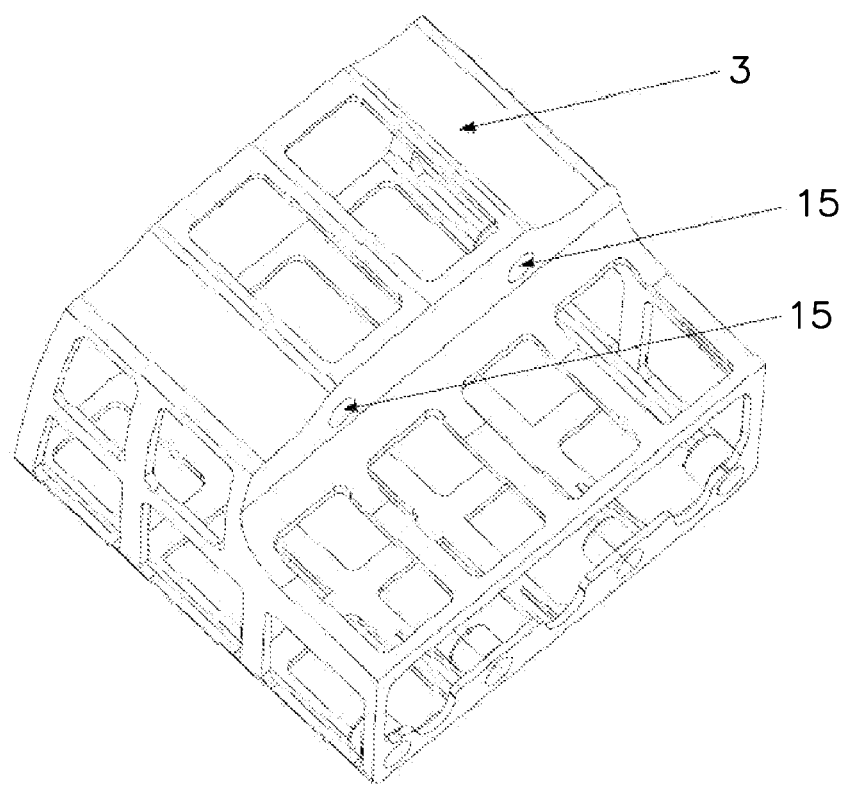
FIG. 9 is a schematic view of an overall structure of an internal filter screen.
Figure 10:
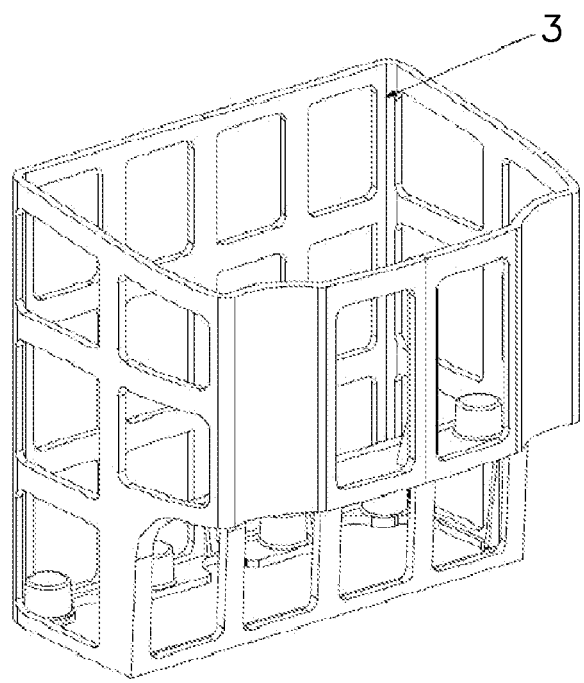
FIG. 10 is a schematic view of an overall structure of an internal filter screen at another angle.

Vehicle body 1; Outer filter screen 2; Internal filter screen 3; Upper cover 4; The first drain outlet 5; The second drain outlet 6; The first drain pipe 7; The second drain pipe 8; The first propeller 9; The second propeller 10; One-way valve 11; The dirt suction port 12; Step structure 13; positioning column 14; positioning hole 15; Hall switch 16.

Implementation of the objectives, functional features, and advantages of the present disclosure are further described with reference to the accompanying drawings in combination with embodiments.

DETAILED DESCRIPTION

The technical solutions in the embodiments of the present disclosure will be described clearly and completely below in combination with the drawings in the present disclosure. Obviously, the described embodiments are only part of the embodiments of the present disclosure, not all of them. Based on the embodiments of the present disclosure, all other embodiments obtained by ordinary technicians in the field without creative work belong to the scope of protection of the present disclosure.

Referring to FIGS. 1 to 10, the present disclosure provides a robot with double drain pipe consisting of a first drain pipe 7 and a second drain pipe 8. A preferred embodiment of the robot with double drain pipes of the present disclosure comprises a vehicle body 1, an outer filter screen 2 and an internal filter screen 3.

The outer filter screen 2 is detachably disposed in the vehicle body 1, the internal filter screen 3 is detachably disposed in the outer filter screen 2, an outer wall of the internal filter screen 3 and an inner wall of the outer filter screen 2, and/or an inner wall of the internal filter screen 3 is provided with foam (not shown in the figure).

A sensing device for sensing an internal filter screen 3 is provided in a vehicle body 1, and a climbing driving mechanism for driving a swimming pool robot to climb a slope is symmetrically provided at two sides of the top of the vehicle body 1.

The vehicle body 1 is further provided with a controller (not shown in the figure) respectively connected to the sensing device and the climbing driving mechanism, and the controller is used for closing the climbing driving mechanism when the sensing device senses the internal filter screen 3.

In this embodiment, considering that the swimming pool robot in the prior art has a simple structure, only one dust bag for accommodating the dirt in the swimming pool is generally installed, such as leaves, sand, etc., if a dust bag with a low density is used, the dust bag can only contain large volumes of dirt such as leaves, impurities with a small volume, such as sand, will leak into the swimming pool robot through the dust bag, thereby affecting the normal operation thereof, Therefore, in this embodiment, the double-dust bag structure comprising the outer filter screen 2 and the internal filter screen 3 is detachably disposed in the vehicle body 1, When dirt with a relatively large volume is accommodated, the outer filter screen 2 is used to accommodate the dirt; and when dirt with a relatively small volume is accommodated, the internal filter screen 3 provided with foam is placed in the outer filter screen 2, and the internal filter screen 3 receives dirt, thus preventing the dirt from entering the vehicle body 1.

In addition, since the density of the foam is high, this embodiment considers that when a dust bag with a high density is used, dirt with a small volume can be accommodated well, however, due to its high density, the flow rate of the water discharged from the drain pipe is influenced, and the reaction force of the water discharged from the drain pipe is reduced, affecting the forward, backward, or climbing of the swimming pool robot; therefore, in the present embodiment, a sensing device for sensing an internal filter screen 3 is provided in a vehicle body 1, when an sensing device senses an internal filter screen 3 and there is a swimming pool wall in front of a swimming pool robot, the swimming pool robot is controlled to turn around or turn.

As an embodiment, in this embodiment, the top of the vehicle body 1 is provided with an upper cover 4.

Further, in this embodiment, the climbing driving mechanism comprises a first drain outlet 5 and a second drainage outlet 6 symmetrically disposed at two sides of the top of the vehicle body 1, and a first driving unit and a second driving unit disposed in the vehicle body 1, wherein the first driving unit and the second driving unit are respectively used for driving the first drain outlet 5 and the second drain outlet 6 to drain water, so as to drive a swimming pool robot to climb a slope.

In this embodiment, a first water discharge outlet 5 and a second water discharge outlet 6 are symmetrically arranged at two sides of the top of the vehicle body 1 to provide auxiliary climbing power for the swimming pool robot, and the reactive force of the water received at the two sides of the vehicle body 1 is the same, so that the movement direction of the swimming pool robot can be precisely controlled.

Specifically, a water inlet is provided at the bottom of the vehicle body 1, the first drain pipe 7 and the second drain pipe 8 which are in communication with the water inlet are symmetrically provided in the vehicle body 1, a first drain outlet 5 is formed in an opening at the top of the first drain pipe 7, and a second drain outlet 6 is formed in an opening at the top of the second drain pipe 8.

The first driving unit comprises a first propeller 9 provided in the first drain pipe 7, and a first drive motor provided in the vehicle body 1 and connected to the first propeller 9. The second driving unit comprises a second propeller 10 provided in the second drain pipe 8, and a second drive motor provided in the vehicle body 1 and connected to the second propeller 10. The first drive motor and the second drive motor are respectively connected to the controller.

When the first drive motor and the second drive motor work, the corresponding first propeller 9 and second propeller 10 are driven to rotate, so as to drain the water in the first drain pipe 7 and the water in the second drain pipe 8 through the first drain outlet 5 and the second drain outlet 6, thereby providing slope-climbing power for the swimming pool robot. When the sensing device senses the internal filter screen 3 and there is a swimming pool wall in front of the swimming pool robot, the controller controls the first drive motor and the second drive motor to stop working, closes the climbing function of the swimming pool robot, and controls the swimming pool robot to turn around or turn.

Further, in this embodiment, the bottom of the vehicle body 1 is provided with a one-way valve 11 at the position of the water inlet for opening or closing the water inlet.

The bottoms of the outer filter screen 2 and the internal filter screen 3 are provided with a dirt suction port 12 in communication with the water inlet.

In this embodiment, a step structure 13 is disposed at a rear end of the vehicle body 1, a rear end of the outer filter screen 2 is a groove structure corresponding to the step structure 13, and the outer filter screen 2 is detachably disposed on the step structure 13.

In the present embodiment, the step structure 13 is provided at the rear end in the vehicle body 1, the rear end of the outer filter screen 2 is a groove structure corresponding to the step structure 13, and the outer filter screen 2 is detachably provided on the step structure 13, thus its structure is simple, the installation and detachment are facilitated, the stability is good, and shaking of the outer filter screen 2 in the vehicle body 1 after dirt is accommodated can be avoided.

Further, in this embodiment, the rear end of the internal filter screen 3 is a groove structure corresponding to the outer filter screen 2, a locating column 14 is provided in the outer filter screen 2, and a locating hole 15 corresponding to the locating column 14 is provided at the bottom of the internal filter screen 3.

When the internal filter screen 3 is assembled, it is only required to place the internal filter screen 3 in the outer filter screen 2 and position the internal filter screen 3 through the positioning columns 14 and the corresponding positioning holes 15. The structure is simple and is easy to assemble and disassemble.

It should be noted that, in this embodiment, the sensing device may adopt a solution of a hall switch 16 and a sensing magnet (not shown in the figure). Specifically, in this embodiment, the sensing device comprises a sensing magnet provided on the internal filter screen 3 and a hall switch 16 provided in the vehicle body 1 and corresponding to the sensing magnet, and the Hall switch 16 is connected to the controller. The specific assembling positions of the hall switch 16 and the sensing magnet are not limited in this embodiment, as long as the function of the induction inner filter net 3 can be achieved.

The beneficial effects of the swimming pool robot with double drain pipes of the present disclosure are as follows: in the present disclosure, by means of the described technical solution, the robot comprises: a vehicle body 1, an outer filter screen 2 and an internal filter screen 3; the outer filter screen 2 is detachably provided in the vehicle body 1, the internal filter screen 3 is detachably provided in the outer filter screen 2, an outer wall of the internal filter screen 3 and an inner wall of the outer filter screen 2, and/or an inner wall of the internal filter screen 3 is provided with foam; a sensing device for sensing an internal filter screen 3 is provided in a vehicle body 1, and a climbing driving mechanism for driving a swimming pool robot to climb a slope is symmetrically provided at two sides of the top of the vehicle body 1; a controller connected to the sensing device and the climbing driving mechanism is further provided in the vehicle body 1, and the controller is used for controlling the swimming pool robot to turn around or turn when the sensing device senses the internal filter screen 3 and a swimming pool wall is provided in front of the swimming pool robot, which not only enriches the functionality of the swimming pool robot, improves the applicability range of a swimming pool for collecting dirt, improves the efficiency of cleaning a swimming pool, and precisely controls the movement direction of a swimming pool robot.

Figure 11:
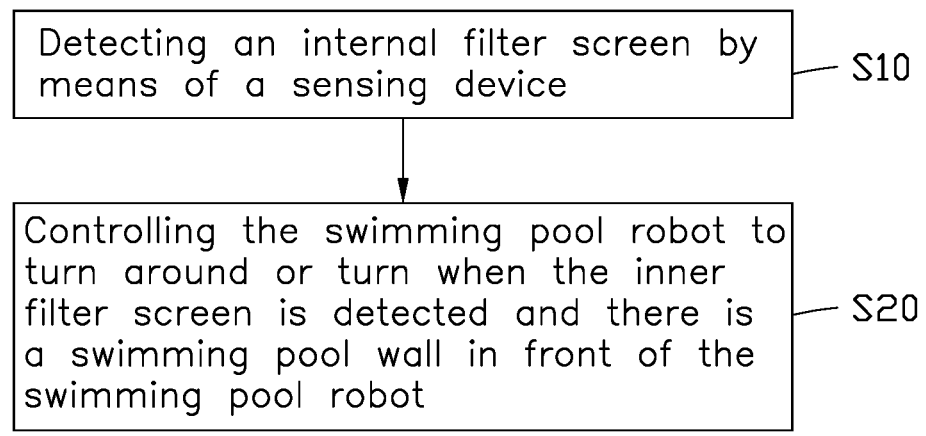
FIG. 11 is a schematic flowchart of a preferred embodiment of a method for controlling a swimming pool robot with double drain pipes according to the present disclosure.

In order to achieve the described object, the present disclosure further provides a method for controlling the swimming pool robot with double drain pipes. The method is applied to the swimming pool robot with double drain pipes of the described embodiments. As shown in FIG. 11, the preferred embodiment of the method for controlling the swimming pool robot with double drain pipes of the present disclosure comprises the following steps:

Step S10, detecting an internal filter screen by means of a sensing device.

The sensing device in this embodiment may adopt a solution of a hall switch and a sensing magnet. Specifically, in this embodiment, the sensing device comprises a sensing magnet provided on the internal filter screen and a hall switch provided in the vehicle body and corresponding to the sensing magnet, and the hall switch is connected to the controller. A specific installation position of the hall switch and the sensing magnet is not limited in this embodiment, as long as the function of the sensing internal filter screen can be implemented.

Step S20, controlling the swimming pool robot to turn around or turn when the internal filter screen is detected and there is a swimming pool wall in front of the swimming pool robot.

In this embodiment, considering that the swimming pool robot in the prior art has a simple structure, only one dust bag for accommodating the dirt in the swimming pool is generally installed, such as leaves, sand, etc., if a dust bag with a low density is used, the dust bag can only contain large volumes of dirt such as leaves, impurities with a small volume, such as sand, will leak into the swimming pool robot through the dust bag, thereby affecting the normal operation thereof, therefore, in this embodiment, the double-dust bag structure comprising the outer filter screen and the internal filter screen is detachably disposed in the vehicle body, When dirt with a relatively large volume is accommodated, the outer filter screen is used to accommodate the dirt; and when dirt with a relatively small volume is accommodated, the internal filter screen provided with foam is placed in the outer filter screen, and the internal filter screen receives dirt, thus preventing the dirt from entering the vehicle body.

In addition, since the density of the foam is high, this embodiment considers that when a dust bag with a high density is used, dirt with a small volume can be accommodated well, however, due to its high density, the flow rate of the water discharged from the drain pipe is influenced, and the reaction force of the water discharged from the drain pipe is reduced, affecting the forward, backward, or climbing of the swimming pool robot; therefore, in the present embodiment, a sensing device for sensing an internal filter screen is provided in a vehicle body 1, when an sensing device senses an internal filter screen and there is a swimming pool wall in front of a swimming pool robot, the swimming pool robot is controlled to turn around or turn.

In this embodiment, the climbing driving mechanism comprises a first drain outlet and a second drain outlet symmetrically disposed at two sides of the top of the vehicle body, and a first driving unit and a second driving unit disposed in the vehicle body, wherein the first driving unit and the second driving unit are respectively used for driving the first drain outlet and the second drain outlet to drain water, so as to drive a swimming pool robot to climb a slope.

In this embodiment, a first drain outlet and a second drain outlet are symmetrically arranged at two sides of the top of the vehicle body to provide auxiliary climbing power for a swimming pool robot, so that the movement direction of the swimming pool robot can be precisely controlled.

The beneficial effects of the swimming pool robot with double drain pipes of the present disclosure are as follows: by means of the described technical solution, detecting an internal filter screen by means of a sensing device, and when the internal filter screen is detected and a swimming pool wall is provided in front of a swimming pool robot, controlling the swimming pool robot to turn around or turn, which not only enriches the functionality of the swimming pool robot, improves the applicability range of a swimming pool for collecting dirt, improves the efficiency of cleaning a swimming pool, and precisely controls the movement direction of a swimming pool robot.

The foregoing descriptions are merely exemplary embodiments of the present disclosure, but are not intended to limit the patent scope of the present disclosure. Any equivalent structural change made by using the description and the accompanying drawings of the present disclosure under the concept of the present disclosure, or direct/indirect application in other related technical fields, is included in the patent scope of the present disclosure.

What is claimed is:

1. A swimming pool robot with double drain pipes, the swimming pool robot comprising:
   a vehicle body;
   an outer filter screen;
   an internal filter screen detachably disposed in the vehicle body and detachably disposed in the outer filter screen, wherein at least one of an outer wall of the internal filter screen, an inner wall of the outer filter screen, or an inner wall of the internal filter screen is provided with foam;
   a sensing device for sensing the internal filter screen provided in the vehicle body; and
   a climbing driving mechanism for driving the swimming pool robot to climb a slope symmetrically provided at two sides of a top portion of the vehicle body, wherein
   the vehicle body is further provided with a controller connected to the sensing device and the climbing drive mechanism,
   wherein the sensing device comprises:
      a sensing magnet provided on the internal filter screen, and
      a hall switch provided in the vehicle body and corresponding to the sensing magnet, and the hall switch is connected to the controller,
   wherein the climbing driving mechanism comprises:
      a first drain outlet and a second drain outlet symmetrically disposed at two sides of the top portion of the vehicle body, and
      a first driving unit and a second driving unit disposed in the vehicle body, the first driving unit and the second driving unit are configured to, respectively, drive the first drain outlet and the second drain outlet to drain water, so as to drive the swimming pool robot to climb the slope, and
   wherein a water inlet is provided at a bottom portion of the vehicle body, and a first drain pipe and a second drain pipe that are in communication with the water inlet are symmetrically provided in the vehicle body, the first drain outlet is formed at a top opening of the first drain pipe, and the second drain outlet is formed at a top opening of the second drain pipe,
   wherein the first driving unit comprises:
      a first propeller provided in the first drain pipe, and
      a first drive motor provided in the vehicle body and connected to the first propeller,
   the second driving unit includes:
      a second propeller provided in the second drain pipe, and
      a second drive motor provided in the vehicle body and connected to the second propeller, and
   the first drive motor and the second drive motor are connected to the controller; and
   wherein the controller is configured to control whether the first drive motor and the second drive motor stop working, and control whether the swimming pool robot turn around or turn based on a detection result output from the sensing device, when the detection result shows that the sensing device has sensed the internal filter screen installed in the vehicle body and sensed that a swimming pool wall exists in front of the swimming pool robot, the controller controls the first drive motor and the second drive motor to stop working, and controls the swimming pool robot to turn around or turn.

2. The swimming pool robot with double drain pipes according to claim 1, wherein the bottom portion of the vehicle body is provided with a one-way valve at a position of the water inlet for opening or closing the water inlet.

3. The swimming pool robot with double drain pipes according to claim 1, wherein a bottom portions of the outer filter screen and the internal filter screen are provided with a dirt suction port in communication with the water inlet.

4. The swimming pool robot with double drain pipes according to claim 1, wherein a step structure is disposed at a rear end of the vehicle body, a rear end of the outer filter screen is a groove structure corresponding to the step structure, and the outer filter screen is detachably disposed on the step structure.

5. The swimming pool robot with double drain pipes according to claim 4, wherein a rear end of the internal filter screen is a groove structure corresponding to the outer filter screen, a locating column is provided in the outer filter screen, and a locating hole corresponding to the locating column is provided at a bottom portion of the internal filter screen.

6. A control method performed by the swimming pool robot with double drain pipes according to claim 1, and the method comprising:
    detecting whether the internal filter screen is installed in the vehicle body using the sensing device;
    detecting whether a swimming pool wall exists in front of the swimming pool robot, and
    when the internal filter screen is installed in the vehicle body and the swimming pool wall exists in front of the swimming pool robot, controlling the first drive motor and the second drive motor to stop working, and controlling the swimming pool robot to turn around or turn.

\* \* \* \* \*